Jan. 16, 1951 W. H. SAUER 2,538,384
GLARE SHIELD ATTACHMENT FOR VEHICLE SUN VISORS
Filed Oct. 7, 1948

Inventor
WALTER H. SAUER
By Martin E. Anderson
Attorney

Patented Jan. 16, 1951

2,538,384

UNITED STATES PATENT OFFICE 2,538,384

GLARE SHIELD ATTACHMENT FOR VEHICLE SUN VISORS

Walter H. Sauer, Fowler, Colo.

Application October 7, 1948, Serial No. 53,240

4 Claims. (Cl. 296—97)

This invention relates to improvements in glare shields for vehicles and more particularly to an attachment which may be readily secured to existing sun visors on automobiles and is a continuation in part of my application Serial No. 14,373, filed March 11, 1948 and now Patent No. 2,498,966, dated February 28, 1950.

Under certain driving conditions such as in late afternoon when the rays of the sun are low, or even during midday on roads which have high reflection characteristics, or at night when encountering the headlights of approaching automobiles, the glare is often excessive, sometimes temporarily blinding the vehicle operator and resulting in accidents. Even under less severe conditions, it causes undue eye strain and annoyance to the driver and occupants of the automobile. Sun visors are provided at present on automobiles which are intended to obviate the glare to some extent, but they are made opaque which renders them useless for unobstructed vision. They are effective for a certain period of time during the day, but when the rays of the sun are very low, they offer no protection because even in lowered position the direct rays and reflected light pass through the windshield beneath the visor. Any attempt at lowering the visor would be to no avail because, being opaque, forward vision would be obstructed completely. Transparent and colored glare shields have been devised to obviate the foregoing deficiencies of present automotive equipment, but so far as is known, these devices when used in combination with an opaque shield have required fabricating a complete unit, that is, the opaque shield and colored shield. This, of course, has entailed considerable expense in manufacture which restricts their use to only those who may afford them as a luxurious accessory. Moreover, the opaque shields used therewith serve no superior purpose than present opaque shields, hence this type of construction results in unnecessary duplication of manufacture and also cost to the motorist, since the present shield must be discarded if the glare shield is desired.

The principal object of this invention, therefore, is to provide a glare shield attachment for present opaque visors, so that the opaque visor may be used alone, as at present, or used with the shield.

Another object is to provide a simplified attachment which is solely supported at one edge of an opaque visor and is readily attachable thereto.

Another object is to provide an attachment which is almost universal in application to present opaque visors and will also fit either the right or left visor.

A further object is to provide a glare shield attachment which is simple and rugged in construction, easy and economical to manufacture and adapted to fit all opaque visors with, at most, only slight alterations.

Still further objects will become apparent from a consideration of the description to follow, the appended claims, and the accompanying drawing, in which:

Figure 1:
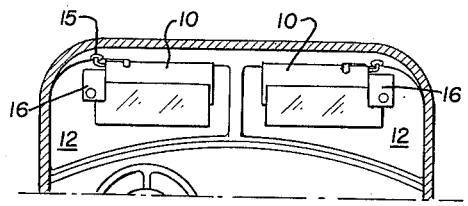
Figure 1 is an elevation of the interior of an automobile showing the conventional visors and the attachment applied thereto.

Referring to the drawing, there is shown in Figure 1 a pair of conventional opaque visors 10 which are pivotally secured to the automobile adjacent the windshield 12, by a rod 13, the end 14 of which enters a suitable bracket 15. Visors 10 may swing about the longitudinal axis of rod 13 and also about the axis of end 14 so that the visors may be adjusted to the position shown in Figure 1, partly obstructing the windshield, or to a position in which they lie substantially against the top of the automobile, or to a position partly obstructing the side window of the automobile, or to any intermediate positions.

Figure 2:
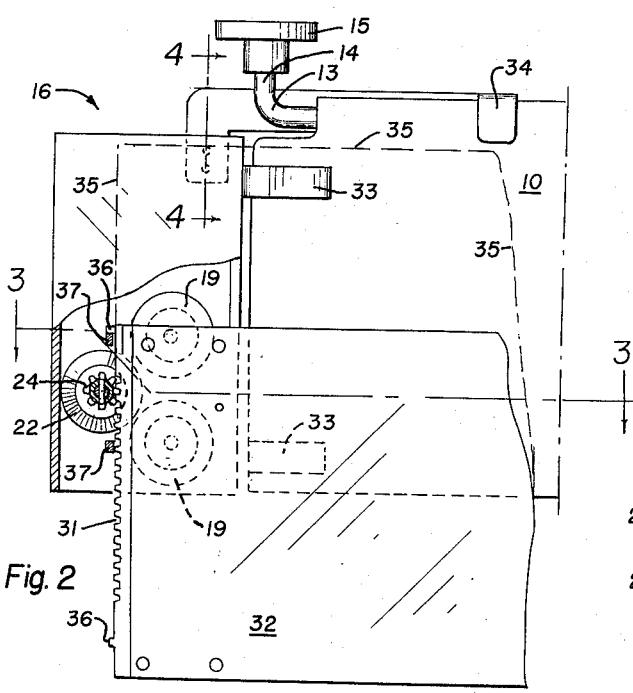
Figure 2 is an enlarged elevation, partly broken away, of a portion of a visor and attachment shown in Figure 1.
Figure 3:
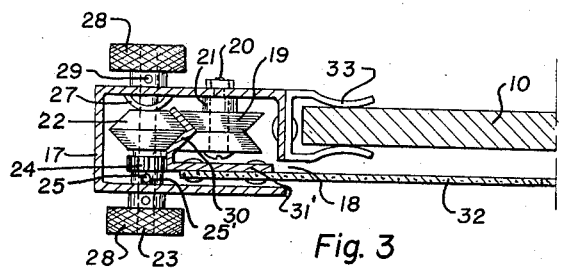
Figure 3 is a section taken on line 3—3, Figure 2.

Attachment 16 is formed with a tubular casing 17, as best shown in Figures 2 and 3, which is open at its ends and along one side as shown by slot 18. A pair of V rollers 19 are journaled within the casing on shouldered pins 20, these pins being secured to casing 17 by nuts, as shown. Spacers 21 may also be provided on pins 20 so that the rollers may rotate on the pins but have no axial movement thereon.

A diamond shaped roller 22 is carried by a shaft 23, journaled in opposite walls of the casing. Shaft 23 has affixed thereto a pinion 24 by means of a pin 25 which engages a slot 25' in the hub of the pinion. Pin 25 may be a tight drive fit in shaft 23 and to permit the assembly of the parts, slots 26 (Figure 6) may be provided adjacent the shaft journals through which the pin may pass. Between roller 22 and the other wall of the casing, a cup-shaped spring washer 27 is provided to impart frictional resistance against turning of shaft 23 so that such shaft when adjusted to a certain position will remain thereat. The ends of shaft 23 have secured thereto knurled knobs 28 by any suitable means such as pins 29.

A V-shaped plate member 30 is disposed between the rollers previously described, this member having a rack 31 along an edge thereof which engages pinion 24. Member 30 also has a flat portion 31' to which is secured glare shield 32. This shield may be of any suitable material used for eliminating glare, such as polaroid glass, transparent colored glass, plastic, or the like. A pair of spring clips 33 are secured to one edge of casing 17 and engage an edge of visor 10. A third clip 34 may also be provided engaging a top edge of visor 10.

From the foregoing description it will now become apparent that upon rotation of either of knobs 28, the shield may be moved from the full extended position shown in Figure 2, to the dotted position shown by dotted lines 35. When in the latter position, the visor 10 may be used in its normal manner and when in the former position the glare shield 32 forms an extension of the visor through which the operator may observe the road. It is, of course, apparent that glare shield 32 may be adjusted to any intermediate position between the limits described. Suitable stops 36 may be carried by the member 30 to limit its movement in opposite directions, these stops engaging any suitable abutments 37 on casing 17.

In the form of the invention just described, it will be noted that the same attachment 16 may be applied to the outer edge of either of visors 10, as shown on Figure 1 by merely rotating it 180 degrees about the vertical axis thereof. Glare shield 32 would, of course, lie on one side of one of the visors and on the opposite side of the other. If it be desired to have both glare shields on the same side of visors 10 this result may be achieved by the construction shown in Figure 5. As therein shown, rollers 22 and 19 are disposed symmetrically with respect to the ends of casing 17 and the glare shield may project, when extended, to either side thereof as shown by the full lines at the bottom thereof and the dotted lines at the top. With this construction casing 17 may be rotated 180 degrees about its transverse axis and applied to the edge of the opposite visor, the glare shields then lying on the same side of the respective visors.

Figure 6:
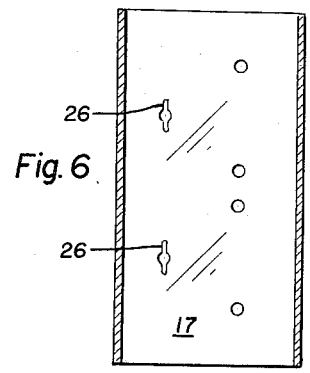
Figure 6 is a section of another modified detail.
Figure 5:
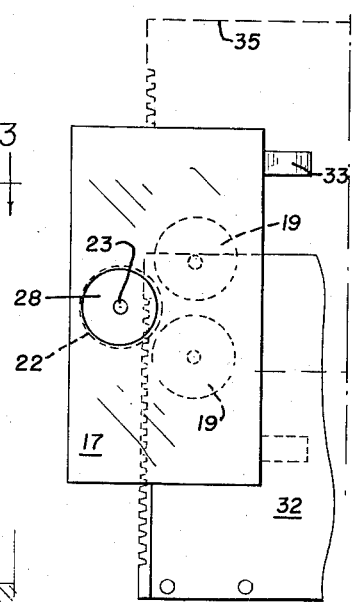
Figure 5 is a view similar to Figure 1 showing a modification of the invention.
Figure 4:
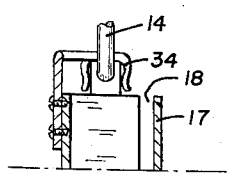
Figure 4 is a section taken on line 4—4, Figure 3.

In Figure 6 is shown another modification which permits the same results obtainable with the construction shown in Figure 5, but retains all the advantages of the form shown in Figure 2. In Figure 2 it will be observed that the rollers are placed as close to one end of the casing as possible. This permits maximum movement of plate member 30 within the guide rollers. A portion of this movement is sacrificed in Figure 5 when the rollers are symmetrically arranged at the center of the casing. In Figure 6, however, extra sets of holes for the shaft 23 and pins 29 are provided, these sets being the same distance from the respective ends of the casing. When it is desired to make, say a right hand attachment, the rollers and pins are assembled in this extra set of holes. When the casing is then rotated 180 degrees about its transverse axis, knobs 28 will then all be toward the bottom ends of the casings and the glare shields will lie on the same side of the respective visors.

The dual knobs are of advantage regardless of the type of construction previously described. In the first described construction, a knob 28 will be exposed in convenient position, although glare shields 32 lie on opposite sides of visors 10. Also, when the visor 10 is swung over a side window, the opposite knob becomes accessible for regulating the height of the glare shield with respect to the side window. Thus both knobs are of utility regardless of which construction is employed.

It is also apparent that while the attachment is shown with a length substantially the same as the width of the visor, it may be made any length desired, such, for example, as longer than the width of the visor. With such construction the range of movement of the glare shield will, of course, be increased and by proper proportioning of the parts, the entire glare shield could be disposed below the visor. Also, the glare shield need not necessarily be of a width coextensive with the length of the attachment or visor and may, for example, be of a width substantially equal to its projection beyond the visor, thus effecting a saving in the material necessary for the glare shield. Also, while the visor has been described as opaque, the invention will also be of utility where the visor is transparent or translucent and it is desired to form an extension of such visor. Many other modifications will also become apparent which are within the spirit of the invention and it is to be understood, accordingly, that the disclosure is illustrative only and not limited thereto except as defined by the appended claims.

Having described the invention what is claimed as new is:

1. An attachment for visors comprising, a member adapted to be secured to a side edge of a visor, a plate rectilinearly movable with respect to said member, said plate being guided between a pair of rollers on one side thereof and another roller on the other side, a rack on said plate, a pinion meshing with said rack, means for rotating said pinion, and a glare shield secured to said plate adapted to lie adjacent the visor.

2. An attachment for visors comprising, an elongated tubular member having a longitudinal slot therein, means for securing said member to a side edge of a visor, a plate having a portion thereof V-shaped in cross section and rectilinearly movable within said member, said plate being guided by rollers on opposite sides thereof having a configuration to engage said V-shaped portion, one of said rollers being mounted on a shaft projecting through the walls of said member, a rack on said plate, a pinion affixed to said shaft meshing with said rack, means on both ends of said shaft for rotating same, and a glare shield secured to said plate extending through said slot adapted to lie adjacent the visor.

3. An attachment for visors comprising; a housing member, means for securing the housing member to a side edge of a visor forming an extension thereof, a glare shield adapted to lie adjacent an outer surface of the visor, means within the housing for guiding and moving the glare shield rectilinearly parallel with the visor, means connecting the glare shield with the means aforesaid, and manually operable means carried by the housing for effecting movement of the moving means within the housing.

4. An attachment for visors comprising a member adapted to be secured to one side edge of a visor, a plate rectilinearly movable with respect to said member, said plate being guided between a pair of rollers on one side thereof and another roller on the other side, a glare shield adapted to lie adjacent an outer surface of the visor, means connecting the plate to an edge of the glare shield, the last named roller being mounted on a rotatable shaft, and means comprising the shaft for effecting movement of the plate relative to the member when the shaft is rotated.

WALTER H. SAUER.

REFERENCES CITED

The following references are of record in the file of this patent:

UNITED STATES PATENTS

| Number | Name | Date |
|---|---|---|
| 1,567,480 | Wood | Dec. 29, 1925 |
| 1,645,416 | Collier | Oct. 11, 1927 |